May 6, 1952   J. B. DEMBOSKE   2,595,830
WELDING NUT
Filed Sept. 3, 1946

INVENTOR.
JOSEPH B. DEMBOSKE
BY
ATTORNEY

Patented May 6, 1952

2,595,830

UNITED STATES PATENT OFFICE 2,595,830

WELDING NUT

Joseph B. Demboske, Berea, Ohio, assignor to Edward J. Demboske, Berea, Ohio, and Ray E. Demby, Battle Creek, Mich.

Application September 3, 1946, Serial No. 694,635

1 Claim. (Cl. 151—41.7)

This invention relates to improvements in welding nuts.

In the present art of fastening "welding nuts" great difficulty has been experienced in attaching the nut with the axis of the thread in normal relation to the work due to the non-uniform flow of molten metal building up under the corner or corners of the flat-bottom surface of the welding nut after application of the welding instrument. The present day "welding nut" is formed from special blanks of bar stock composed of ribs located in spaced parallel relationship to each other constituting four-cornered projections or lugs when die struck or sheared. The bottom surface of the nut thus formed is a flat plane, thus, when the welding tool is applied to the upper surface of the said nut, the projections or lugs melt and form the welded bond. However, the metal does not always melt uniformly, thus the nut is often disposed in angular vertical relation to the surface to which it is attached necessitating the removal of the nut and replacement by another. This fact is particularly true of non-ferrous type of welding nuts such as aluminum, for example.

The present invention will eliminate this difficulty by providing a welding nut with a chamfered undersurface to permit the projecting lugs to melt and any excess of metal to flow into the chamfered portion, thus allowing a perfect seating of the nut after application of the welder's tool.

Another object of the invention is to provide a welding nut which may be made at an extremely high rate of production with the minimum number of operations and labor.

Still another object of the present invention is to provide a welding nut which may be manufactured from standard bar stock or so-called ribbon.

An object of the invention resides in producing a welding nut which will always seat itself against the work with the center axis of the thread in normal relation to the body to which it is welded.

Another object of the invention is to provide a welding nut formed in such a fashion as to facilitate welding an aluminum nut to a body in the customary manner.

Other objects and advantages more or less ancillary to the foregoing and the manner in which all the various objects are realized will appear in the following description, which, considered in connection with the accompanying drawings, sets forth the preferred embodiment of the invention.

Referring to the drawings.

Figure 5:
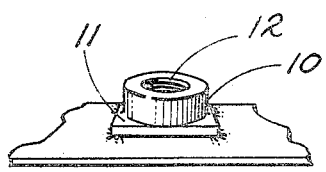
Fig. 5 is a perspective view of the nut in assembled relation with a fragmentary portion of the plate to which it is attached.
Figure 4:
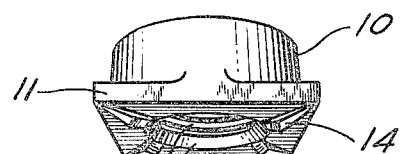
Fig. 4 is a perspective view of the nut illustrating, in detail, the relation of the lugs with the chamfered central body of the nut thereof.

Referring first to Fig. 5, the welding nut comprises a cylindrical body 10 formed with an integral rectangular base 11 thereon traversing the side walls thereof, preferably tangential to the circumferential face of the cylinder. The unit is die struck from bar stock or so-called ribbon of suitable proportions for each size nut, the cylinder, base, and central opening 12 and chamfer 13 in the lower face of the blank being formed in a single operation while the lugs 14 (Figs. 2 and 4) are formed in a secondary pass.

The lugs 14 are disposed in aligned relation with diagonals through the corners of the base, and are preferably of triangular configuration with the apex thereof equi-distant the medial axis of the opening in the nut. The altitude of each triangular lug is equal and proportioned relative to the depth of the chamfer so that the mass of metal, when melted during the welding operation will not exceed the void formed by the chamfer nor flow into the opening 12. The portions of the base intermediate the lugs 14 are straight and flat so that intimate engagement of the lower face of the nut may be assured when the nut is welded in place.

Figure 1:
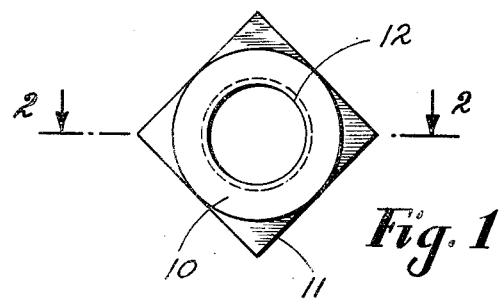
Fig. 1 is a plan view of the improved welding nut.
Figure 2:
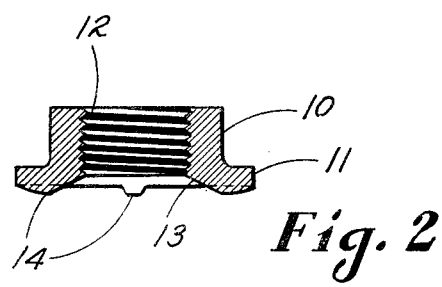
Fig. 2 is a vertical sectional view thereof; the section being taken on a plane indicated by the line 2—2 in Fig. 1.
Figure 3:
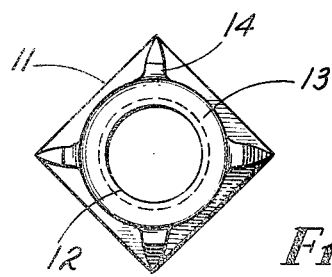
Fig. 3 is a plan view of the lower face of the nut.

As can be seen in Fig. 2, the base or flange 11 is relatively thin in order to effect the ready transmission of heat therethrough during the welding operation. Moreover, the outward corners of the flange as provided herein facilitate the application of the welding tool with greater facility than available in the flush type structures heretofore in use.

The improved nut may be tapped as illustrated or, when made from a soft metal, formed with a cylindrical opening for the reception of a self-tapping screw. In certain environs, it may be desirable to facilitate the blank with a small opening therein, then chill and tap the nut in place after adfixture thereof upon its mating part.

The nut may be made from any material which may be welded in any well-known manner to its companion part and in which the lugs are subject to an initial fusion provided, however, the contiguous concavity in the lower face of the nut is proportioned to receive the overflow and thus prevent the nut from rocking or tipping during the welding operation.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

A welding nut comprising a body having a threaded axial opening therein and an integral rectangular flanged flat base which is thinner than the wall of the body, the lower face of said base having a recess in the central portion thereof, ribs protruding from said flat surface, said ribs being tapered towards the perimeter of the flange and towards said recess.

JOSEPH B. DEMBOSKE.

REFERENCES CITED

The following references are of record in the file of this patent:

UNITED STATES PATENTS

| Number | Name | Date |
|---|---|---|
| 2,042,953 | McArdle et al. | June 2, 1936 |
| 2,096,623 | Almdale | Oct. 19, 1937 |
| 2,167,285 | Smith | July 25, 1939 |
| 2,336,791 | La Barre | Dec. 14, 1943 |
| 2,477,430 | Swanstrom | July 26, 1949 |